Aug. 3, 1954     J. P. RATIGAN     2,685,465
SEALING DEVICE FOR POLISH ROD STUFFING BOXES
Filed Aug. 24, 1951     3 Sheets-Sheet 1
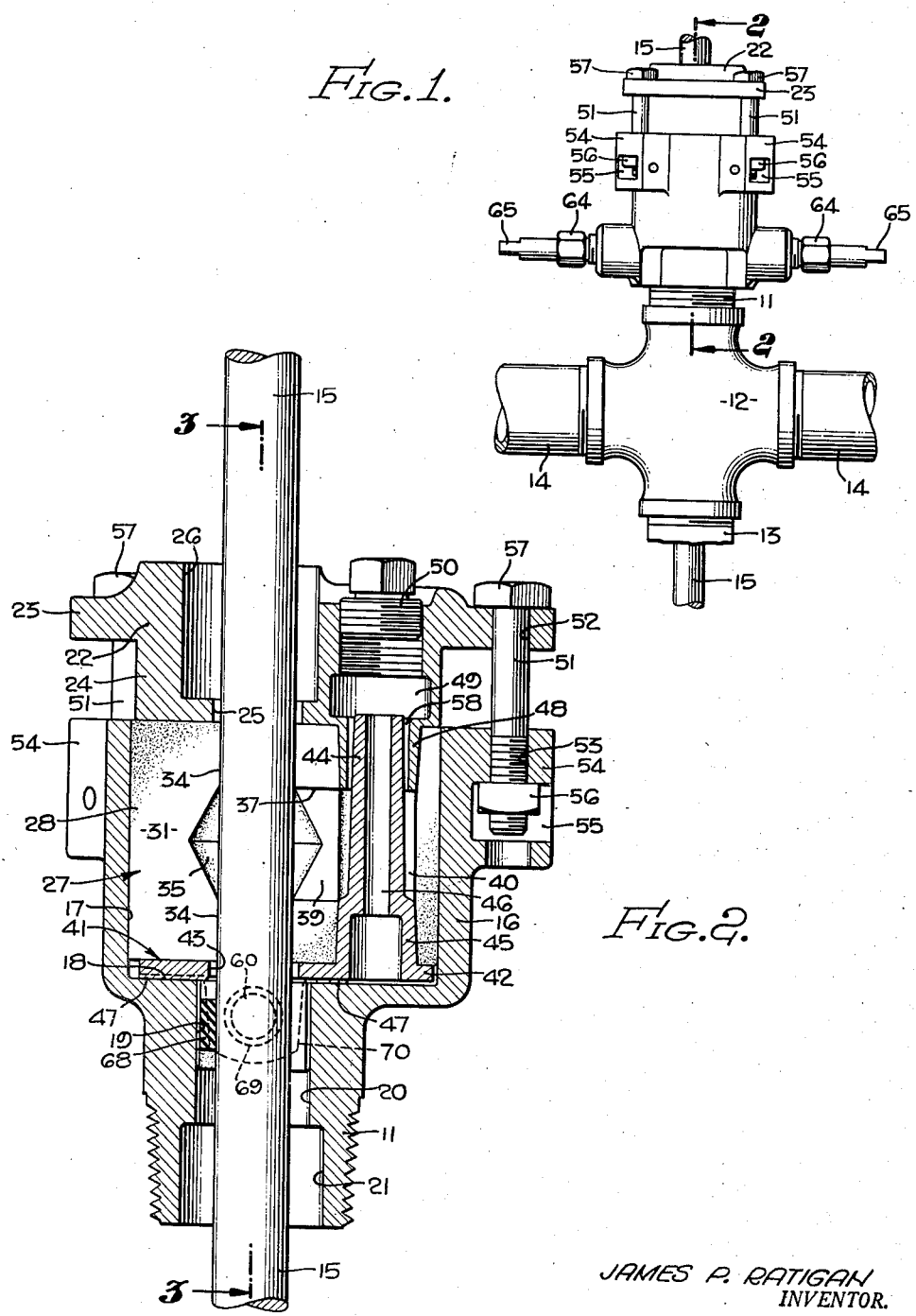
JAMES P. RATIGAN
INVENTOR.
BY *Lyon & Lyon*
ATTORNEYS Aug. 3, 1954 J. P. RATIGAN 2,685,465
SEALING DEVICE FOR POLISH ROD STUFFING BOXES
Filed Aug. 24, 1951 3 Sheets-Sheet 2

JAMES P. RATIGAN
INVENTOR.

BY
*Lyon & Lyon*
ATTORNEYS

Aug. 3, 1954 J. P. RATIGAN 2,685,465
SEALING DEVICE FOR POLISH ROD STUFFING BOXES
Filed Aug. 24, 1951 3 Sheets-Sheet 3
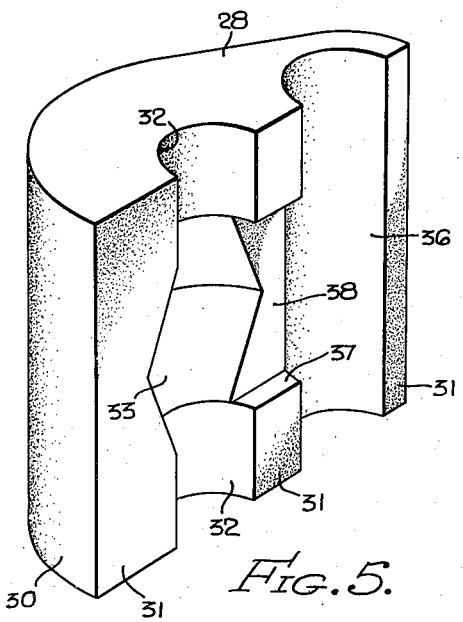
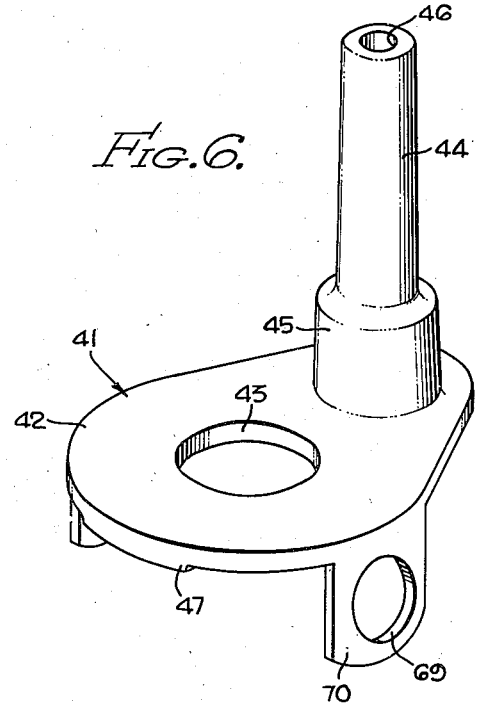
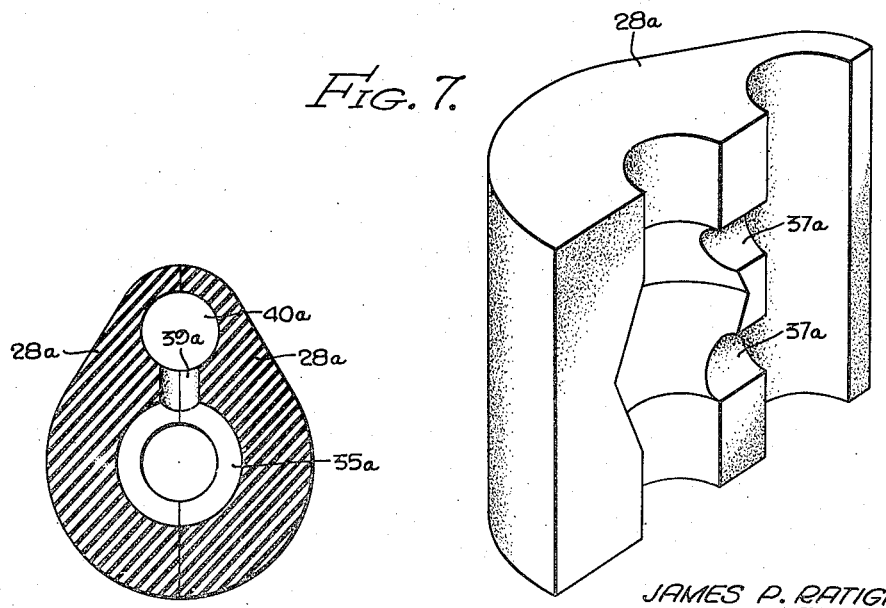
JAMES P. RATIGAN
INVENTOR.
BY *Lyon & Lyon*
ATTORNEYS Patented Aug. 3, 1954

2,685,465

UNITED STATES PATENT OFFICE 2,685,465

SEALING DEVICE FOR POLISH ROD STUFFING BOXES

James P. Ratigan, Los Angeles, Calif., assignor to J. P. Ratigan, Inc., Los Angeles, Calif., a corporation of California Application August 24, 1951, Serial No. 243,433

3 Claims. (Cl. 286—16)

This invention relates to improvements in polish rod stuffing box sealing constructions of the type employed in oil well pumping systems. This invention is directed to an improved form of sealing device for use in self-oiling stuffing box constructions.

An object of this invention is to provide a new and improved form of sealing device comprising duplicate split halves which cooperate to encircle the polish rod.

Another object is to provide such a sealing device which is massive in construction and which is formed of flexible resilient material.

Another object is to provide such a device which is easy to install and which cannot be improperly assembled.

Another object is to provide a polish rod sealing device which forms axially spaced seals defining a lubricant chamber therebetween.

Another object is to provide such a sealing device which may be distorted from its initial shape after a period of use in order to re-establish an efficient sealing relationship with respect to the polish rod.

Other and more detailed objects and advantages will appear hereinafter.

In the drawings:

Figure 1 is a side elevation showing a preferred embodiment of my invention mounted on a well head assembly.

Figure 2 is a sectional elevation taken substantially on the lines 2—2 as shown in Figure 1.

Figure 5 is a perspective view showing the preferred form of sealing block. Two of these blocks cooperate to form a sealing unit.

Figure 6 is a perspective view of the bottom plate and standpipe assembly.

Figure 7 is a perspective view showing a modified form of sealing block.

Figure 8 is a transverse sectional view showing a pair of sealing blocks of the type illustrated in Figure 7.

Figure 3:
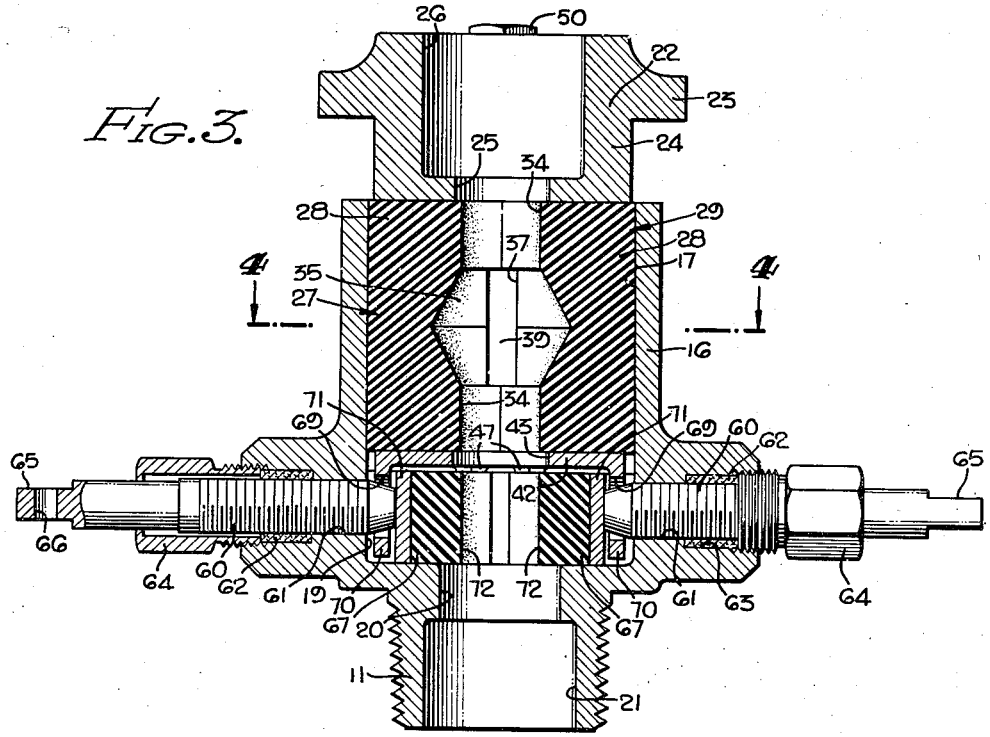
Figure 3 is a transverse sectional elevation taken substantially on the lines 3—3 as shown in Figure 2.

Referring to the drawings, the stuffing box assembly 10 as shown in Figure 1 is provided with a downwardly projecting threaded extension 11 which is mounted on the cross fitting 12. A nipple 13 supports the cross fitting 12 on a conventional casing head assembly, not shown. Lateral pipes 14 are also connected to the cross fitting 12 for conveying well fluid away from the well head.

The polish rod 15 extends through the stuffing box assembly 10 and cross fitting 12 and its lower end is connected to the usual sucker rod string, not shown. The upper portion of the polish rod 15 is suspended by means of the usual clamp from a horsehead, not shown. The polish rod 15 reciprocates within the stuffing box assembly 10 and this motion is communicated through the sucker rods to actuate the pump within the well bore, as will be readily understood by those skilled in the art.

The housing 16 is provided with a vertically extending egg or oval shaped bore 17 which terminates in a floor surface 18. A rectangular channel 19 is provided within the housing 16 below the floor 18. A circular opening 20 is of substantially the same size as the width of the channel 19 and this opening 20 extends centrally of the housing from the channel 19 to the counterbore 21. A clamping head 22 is provided with a flange 23 and a downwardly extending boss 24 which is oval shaped so that it may pass into the interior of the bore 17. The polish rod 15 extends through a central opening 25 in the boss 24 and also extends through the counterbore 26.

Figure 4:
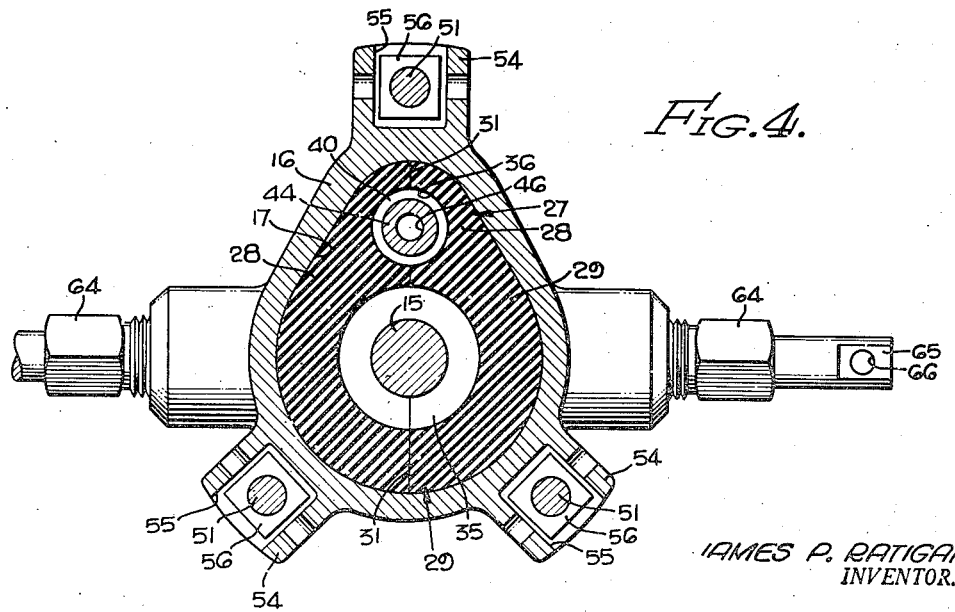
Figure 4 is a sectional plan view taken substantially on the lines 4—4 as shown in Figure 3.

The housing 16 and clamp head 22 cooperate to define a cavity 27 within the oval bore 17. In accordance with my invention, I provide a pair of duplicate sealing blocks 28 which are received within the cavity 27 and which cooperate to form a sealing unit generally designated 29. Each of the sealing blocks 28 is formed of resilient, non-compressible, oil-resistant rubber such as, for example, "Neoprene." I have found that 70 Shore is a satisfactory hardness. The blocks 28 are duplicates and each is provided with an outer surface 30 which is shaped to fit the oval shaped bore 17. The blocks are also provided with a plane surface 31 which is defined by a plane passing through the axis of the polish rid and through the long axis of the oval shaped cavity 27. When the blocks 28 are assembled within the cavity 27, as shown in Figure 4, their plane surfaces 31 are brought into engagement so that the blocks cooperate as split halves to form a sealing unit filling the cavity 27.

Each block 28 is provided with axially spaced semicircular openings 32. These openings are axially aligned and are separated by an enlarged opening 33. When the blocks 28 are assembled within the cavity 27, the semicircular openings 32 cooperate to form axially spaced cylindrical sealing surfaces 34, as shown in Figure 3. Furthermore, the enlarged openings 33 cooperate to define a lubricant chamber 35 positioned between the cylindrical sealing portions 34.

Each block 28 is also provided with an axially extending opening 36 which communicates with the central opening 33 by means of a lateral groove or channel 37. In the form of the block shown in Figures 1–5, the groove or channel 37 is provided with a flat side 38 which extends axially between the semicircular openings 32. When the blocks 28 are assembled to form a sealing unit 29, the grooves or channels 37 cooperate to form a lateral port 39 which communicates between the lubricant chamber 35 and the vertical opening 40 defined between the openings 36.

A bottom plate assembly 41, shown clearly in Figure 6, includes an oval plate 42 having ribs 47 adapted to rest on the floor surface 18 within the oval bore 17. An axially extending opening 43 is provided for the polish rod 15. A standpipe 44 may be formed integrally with the plate and its lower end may be enlarged to form a boss or plug 45. A vertical opening 46 extends through the standpipe 44, plug 45 and plate 42. The upper end of the standpipe 44 projects into a stationary depending tube 48 which is carried on the lower portion of the clamp head 22. The depending tube 48 and the boss 45 fit within opposite ends of the vertical opening 40 within the sealing unit 29. A reservoir 49 is formed within the clamp head 22 and boss 24 and communicates with the passage 46 in the standpipe 44. The upper end of this reservoir 49 may be closed by a threaded plug 50.

Means are provided for applying an end-wise force to the sealing blocks 28 within the cavity 27 to maintain the sealing portions 34 in operative engagement with the surface of the polish rod 15. As shown in the drawings, this means includes a plurality of bolts 51 which pass through apertures 52 in the flange 23 and through openings 53 in the lugs 54. The lugs 54 may be formed integrally with the housing 16 and each lug is provided with an opening 55 for reception of a nut 56. The width of each opening 55 is sufficient to provide clearance for installing the nut 56 but is narrow enough to prevent turning of the nut 56 within the opening 55. Accordingly a wrench, not shown, may be applied to the bolt heads 57 and the bolts 51 may be turned relative to the nuts 56. Such action serves to apply an end-wise compressive force to the sealing blocks 28 within the cavity 27.

In the normal operation of the device, the polish rod 15 extends into the well fluid being produced from the well and this well fluid may extend into the lower portion of the housing 16 through the counterbore 21 and opening 20. The lower sealing portion 34 of the sealing unit 29 formed by the blocks 28 prevents well fluid from passing upwardly along the surface of the polish rod. Well fluid does pass, however, into the extreme lower end of the oval cavity 17 and flows over the floor surface 18 into the opening 46 and upwardly through the standpipe 44 into the reservoir 49. Well fluid in the reservoir gravitates downwardly through the annulus 58 between the standpipe 44 and the interior of the depending sleeve 48. The well fluid then flows into the vertically extending opening 40 and through the lateral port 39 into the lubricant chamber 35 between the spaced seals 34. A supply of lubricant is therefore available to each of the sealing surfaces 34 so long as well fluid is produced from the well. Moreover a sufficient supply of well fluid is present in the reservoir 49, vertical opening 40 and lubricating chamber 35 to lubricate the seals 34 over a period of time when no fluid is produced by the well. Some pumping wells flow by "heads," that is the well fluid does not flow uniformly but on the contrary flows with a large volume for a period of time and then ceases flow altogether for another period of time. Conventional stuffing boxes which do not have the self-oiling feature described above are subject to severe damage to the sealing parts when they run dry during the interval between "heads" of the well. The construction just described avoids this difficulty.

When the sealing surfaces 34 of the sealing unit 29 become worn after a period of use, the bolt heads 57 are turned by means of a wrench to apply additional end-wise force on the sealing unit 29 by means of the clamp head 22. The oval shaped boss enters the bore 17 to displace and distort the rubber sealing unit so that efficient sealing action is reestablished at the surfaces 34. The clamp head 22 may be tightened a number of times until the boss 24 is received completely within the oval bore 17. Until such time, the volume of the lubricating chamber 35 is sufficiently great so that it does not disappear even though the initial shape of the sealing blocks 28 is distorted appreciably to make up for wear of the spaced sealing surfaces 34. The self-oiling feature is thus preserved throughout the range of usefulness of the sealing blocks 28.

When it is necessary to replace the sealing unit 29 after a period of use, the reciprocating motion of the polish rod 15 is arrested. The bolts 51 are then disconnected to permit the clamp head 22 to be moved upwardly away from the housing 16. This exposes the upper end of the oval bore 17 and enables a mechanic to lift the split halves of the sealing unit 29 out of the cavity 27. If the polish rod 15 is not positioned exactly on the center with respect to the axis of the stuffing box, a mechanic may withdraw one of the blocks which is relatively loose within the cavity and then prod the polish rod 15 by any suitable means so that it is moved laterally to permit easy removal of the other sealing block 28. New blocks 28 are then installed by sliding them axially into position. As each block is symmetrical about a medial plane normal to the plane surface 31, the block 28 may be installed with either end surface against the plate 41. Since the blocks and cavity are oval in shape, the only way they will fit into the cavity is in the correct position. Installation in an improper manner is thus prevented. The clamp head 22 is lowered into position and the bolts 51 are retightened to pressurize the new blocks 28 within the cavity 27.

In the event that the well flows by "heads," it may be desirable to shut off the lower end of the housing 16 to prevent surging of well fluid into the cavity 27 during the interval that the mechanic is replacing the rubber sealing blocks 28. Accordingly positive shut off means are provided at the lower end of the housing 16. As best shown in Figure 3 of the drawings, this shut off means includes a pair of opposed axially aligned screws 60 which are mounted in threaded openings 61 provided on the housing 16. Packing 62 is provided in each counterbore 63 and a threaded gland 64 is provided for compressing the packing 62. The outer ends of the screws 60 project through the gland 64 and are provided with wrench flats 65 and with apertures 66. A pair of rubber sealing blocks 67 are mounted in the channel 19 and if desired these blocks may be integrally connected by means of a central web 68. Each of the blocks 67 is provided with a semicircular vertical groove 72 proportioned to fit the sucker rod 15. The screws 60 extend through openings 69 in downwardly extending ears 70 provided on the plate 42. The inner end of each screw 60 engages a metal plate 71 which is bonded to the rear face of each of the blocks 67. Tightening of the screws 60 serves to drive the blocks 67 toward each other to form a shut off seal against the polish rod 15. As set forth in my copending application Serial No. 672,352 for Shut-Off Mechanism, filed May 27, 1946, now abandoned, the rubber material of the blocks 67 is sufficiently resilient so that the blocks may be forced together in the absence of the polish rod 15 or sucker rod to form a seal by distorting the adjacent surfaces of the blocks 67, including the surfaces 72. Pressure exerted against the underside of the blocks 67 moves the blocks against the plate 42 and this plate is held against upward movement by means of the screws 60 which pass through the apertures in the ears 70.

The procedure for installing, tightening or replacing the sealing blocks 28 is the same whether or not the screws 60 are employed for effecting a shut off seal against the polish rod 15.

In the modified form of my invention shown in Figures 7 and 8, the sealing blocks 28ª are substantially the same as those previously described with the exception that the lateral port between the lubricating chamber 35ª and the vertically extending opening 40ª is formed by a pair of vertically spaced radially extending openings 37ª. A pair of ports 39ª are thus provided instead of the single port previously described. The manner of assembly and the mode of operation is substantially the same.

Having fully described my invention, it is to be understood that I do not wish to be limited to the details herein set forth, but my invention is of the full scope of the appended claims.

I claim:

1. A sealing unit for a polish rod stuffing box having a noncircular cavity, the sealing unit having a pair of duplicate resilient rubber block portions adapted to cooperate to encircle a portion of the polish rod passing through the cavity, the block portions having separable engaging surfaces defined by a plane containing the axis of the rod and having an external surface shaped to fit the noncircular cavity, the block portions having upper and lower end surfaces of substantial area, each block portion having aligned axially spaced semicircular bores, the bores in the two block portions each extending to an end surface of the block portions and cooperating to form sliding sealing surfaces with the rod, each block portion also having an enlarged opening positioned between the semicircular bores, the openings in the two block portions cooperating to provide a lubricant chamber, and the block portions having registering lateral ports in said engaging surfaces defining a passage for supplying lubricant to the lubricant chamber.

2. A sealing unit for a polish rod stuffing box having a cavity, the sealing unit having a pair of duplicate resilient rubber block portions adapted to cooperate to encircle a portion of the polish rod passing through the cavity, the block portions having separable engaging surfaces defined by a plane containing the axis of the rod and having an external surface shaped to fit the cavity, the block portions having upper and lower end surfaces of substantial area and having aligned axially spaced bores adapted to form sliding sealing surfaces with the rod, the bores each extending to an end surface of the block portions, the axis of said bores lying in the plane of the engaging surfaces, the block portions also having a lubricant chamber positioned between the semicircular bores and having a lubricant passage extending between the ends of the block portions, and the block portions having registering lateral ports in said engaging surfaces establishing communication between the lubricant chamber and the lubricant passage.

3. In a stuffing box assembly for a polish rod, the combination of: a housing having a cavity, the cavity having an end wall, a sealing unit insertable into the cavity and having a pair of duplicate resilient rubber block portions adapted to encircle a portion of the polish rod passing through the cavity, the block portions having engaging surfaces defined by a plane containing the axis of the rod and having an external surface shaped to fit the cavity, the block portions having upper and lower end surfaces of substantial area, the block portions having aligned axially spaced semicircular bores adapted to form sliding sealing surfaces with the rod, the bores each extending to an end surface of the block portions, the block portions also having a lubricant chamber positioned between the semicircular bores, and the block portions having registering lateral ports in said engaging surfaces defining a passage for supplying lubricant to the lubricant chamber, the lower end surfaces of the block portions engaging said end wall, a clamp head engageable with the upper end surfaces and movable axially of the polish rod for exerting endwise pressure on said rubber block portions to take up for wear, and threaded elements connecting the clamp head to the housing.

References Cited in the file of this patent

UNITED STATES PATENTS

| Number | Name | Date |
|---|---|---|
| 1,897,804 | Hoffman | Feb. 14, 1933 |
| 2,007,501 | Millmine | July 9, 1935 |
| 2,380,189 | Ratigan | July 10, 1945 |

FOREIGN PATENTS

| Number | Country | Date |
|---|---|---|
| 554,331 | Great Britain | of 1943 |